US009738247B2

(12) United States Patent
Boughner et al.

(10) Patent No.: US 9,738,247 B2
(45) Date of Patent: Aug. 22, 2017

(54) SEATBELT BUCKLE INTRUSION PROTECTION DEVICE

(71) Applicant: Autoliv ASP, Inc., Ogden, UT (US)

(72) Inventors: Jonathon G. Boughner, Lake Orion, MI (US); Jon E. Burrow, Ortonville, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 17 days.

(21) Appl. No.: 14/793,021

(22) Filed: Jul. 7, 2015

(65) Prior Publication Data

US 2017/0006973 A1 Jan. 12, 2017

(51) Int. Cl.

*B60R 22/18* (2006.01)
*A44B 11/25* (2006.01)
*B60R 22/195* (2006.01)

(52) U.S. Cl.

CPC ........... *B60R 22/18* (2013.01); *A44B 11/2507* (2013.01); *A44B 11/2546* (2013.01); *A44B 11/2569* (2013.01); *B60R 22/1952* (2013.01); *B60R 2022/1806* (2013.01)

(58) Field of Classification Search

CPC ........ A44B 11/2553; B60R 2022/1806; B60R 22/18

See application file for complete search history.

(56) References Cited

U.S. PATENT DOCUMENTS 5,707,080 A * 1/1998 Isaji .................... B60R 22/1953 280/801.1
6,866,296 B2 * 3/2005 Webber ............... B60R 22/1952 280/806
7,290,791 B2 * 11/2007 Tracht ................... B60R 21/207 280/728.3
8,678,510 B2 * 3/2014 Masutani ............ B60R 22/1955 297/216.1
2004/0004350 A1 * 1/2004 Rogers, Jr. .......... B60R 21/0155 280/801.1
2004/0178620 A1 * 9/2004 Hlavaty .............. B60R 21/0155 280/801.1
2005/0224270 A1 * 10/2005 Holbein .................. B60R 22/03 180/268

(Continued)

FOREIGN PATENT DOCUMENTS

DE 10 2012 200242 A1 7/2013
DE 10 2013 212 927 B3 8/2014

*Primary Examiner* — Karen Beck
(74) *Attorney, Agent, or Firm* — Brinks Gilson & Lione

(57) ABSTRACT

A device for preventing protrusion of a seatbelt anchorage cable into a seat belt system buckle during operation of a pretensioner coupled with the cable and a buckle assembly, the cable of a type affixed at a first end to the pretensioner, and at a second end to the buckle assembly. The cable further having an end wrap forming a loop around a rivet affixed to a frame of the buckle assembly with the cable loop wrapping around the rivet. The device having a feature positioned adjacent to the cable loop and blocking movement of the loop into the buckle. Embodiments include; providing features of a buckle housing in the form of a tab which blocks motion of the cable loop, retainer ring element attached to the buckle frame having features which embrace the cable loop, and clips which can be attached to the buckle assembly, embracing the cable attachment.

5 Claims, 11 Drawing Sheets

35 26 35 38 48 42 46 40 50 19 14 28 16 21 32 30

(56) References Cited

U.S. PATENT DOCUMENTS

2015/0008718 A1* 1/2015 Inagawa ................. B60R 22/18
297/480
2015/0054321 A1* 2/2015 Hirako ................. B60N 2/4221
297/216.1

* cited by examiner 19
21
26
28
16

40
36
14
30

28
14
36
16
26
40
30
19
21
44

32
17

SEATBELT BUCKLE INTRUSION PROTECTION DEVICE

FIELD OF THE INVENTION

This invention relates to a seatbelt buckle device adapted for use as part of a motor vehicle occupant restraint system.

BACKGROUND OF THE INVENTION

Seatbelt systems are in widespread use in motor vehicles. Present systems have certain common elements including seatbelt webbing which extends across the upper and lower torso of the occupant, and one or more retractors for allowing protraction and retraction of the webbing so that the belt may adapt to different sizes of occupants and seat positions, and be conveniently out of the way when not being used. Seatbelt assemblies of the so-called active type further typically include a buckle to which a latch plate is releasably attached.

Seatbelt systems must be securely affixed to motor vehicle structural elements in order to provide the necessary restraint effect in vehicle impact conditions and further to meet government regulation requirements. Further, seatbelt systems need to provide "comfort and convenience" features allowing the occupant easy ingress and egress from the seat under a variety of conditions and situations, and comfort during use.

Typical seatbelt systems include a buckle that is securely mounted to a vehicle structure, such as a seat frame or the floor pan of the vehicle body. The latch plate is attached to the seatbelt webbing. The seatbelt webbing is fixed to the vehicle structure at one end, and the opposite end is usually fixed to a webbing retractor having an internal spool providing protraction and retraction of the webbing in response to various loads, while permitting buckling and unbuckling of the system. The latch plate is typically attached by passing the seatbelt webbing through an opening or slot in the latch plate, such that the latch plate can slide along the webbing and be adjusted relative to the size of the occupant, or it can be fixed to the webbing when multiple retractors are used. A common buckle configuration is in the form of a housing that includes a pushbutton release. An insertion slot is provided to receive the latch plate. A release pushbutton is provided to release the latch plate from the buckle.

In modern high-performance seatbelt restraint systems, pretensioning devices are increasingly utilized. A pretensioner tightens the seatbelt against the occupant in anticipation of a vehicle collision (a so-called pre-pretensioner), or when the onboard sensor system detects a vehicle impact. Various types of pretensioning systems are available which have the effect of reducing slack in the belt system and lost motion between the occupant and the belt system during a vehicle deceleration, which enhances restraint system performance. One type of pretensioner is referred to as a retractor pretensioner and these types normally have a pyrotechnically driven internal device acting on the retractor spool which retracts webbing into the retractor in response to a signal from a body safety controller. Examples of these devices are the applicant's roto-pretensioner products. Another pretensioner type often referred to as a buckle pretensioner, pulls the buckle rapidly toward its anchorage on the vehicle seat or vehicle floor pan. These devices are also typically pyrotechnically activated. These devices are also referred to as lap pretensioners or linear pretensioners. In addition to acting on a seatbelt buckle, similar devices can be implemented to tighten the seatbelt by moving another belt system anchorage point such as a guide loop. An example of a lap pretensioner which may be used with the present invention is described by applicants issued U.S. Pat. No. 7,188,868 which is hereby incorporated by reference.

Pretensioners attached to a seat belt buckle may be connected via a metal strap or a cable, typically of a braided wire type and often with a plastic outer covering. When cables are used, the cable is typically wrapped around a rivet attaching the cable structurally to the frame of the buckle which enables the system to oppose significant restraint loads and meet applicable structural regulation requirements. There is a concern when implementing a cable type system at its attachment to a seatbelt buckle with a buckle pretensioner. In such systems, a very rapid acceleration of the buckle occurs in the retraction direction of the pretensioner when the pretensioner is activated; and when the pretensioner reaches the end of its travel, the buckle can continue its motion due to inertia which can cause the cable to be pushed into the buckle housing. The buckle housing internal mechanisms must operate effectively in a variety of conditions. The potential for the cable protruding into the buckle internal mechanism, also referred to as cable protrusion, is a condition which is not desirable. Moreover, today's seatbelt buckles and belt restraint systems are highly refined designs and is desirable to not require reworking of the components of the belt buckle which can involve significant manufacturing and tooling costs.

SUMMARY

In accordance with the present invention, a number of embodiments of devices for restraining protrusion displacement of a cable attachment are provided.

Embodiments of the invention include; providing features of a buckle housing in the form of a tab which blocks motion of the cable loop, retainer elements attached to the buckle frame having features which embrace the cable loop, and clips which can be attached to the buckle assembly, embracing the cable attachment. In each case, a physical feature is provided which blocks protrusion motion of the cable loop into the buckle assembly which would otherwise occur due to a relative pushing motion of the cable into the buckle assembly which can occur in certain restraint activation conditions described previously.

DETAILED DESCRIPTION OF THE INVENTION

Figure 1:
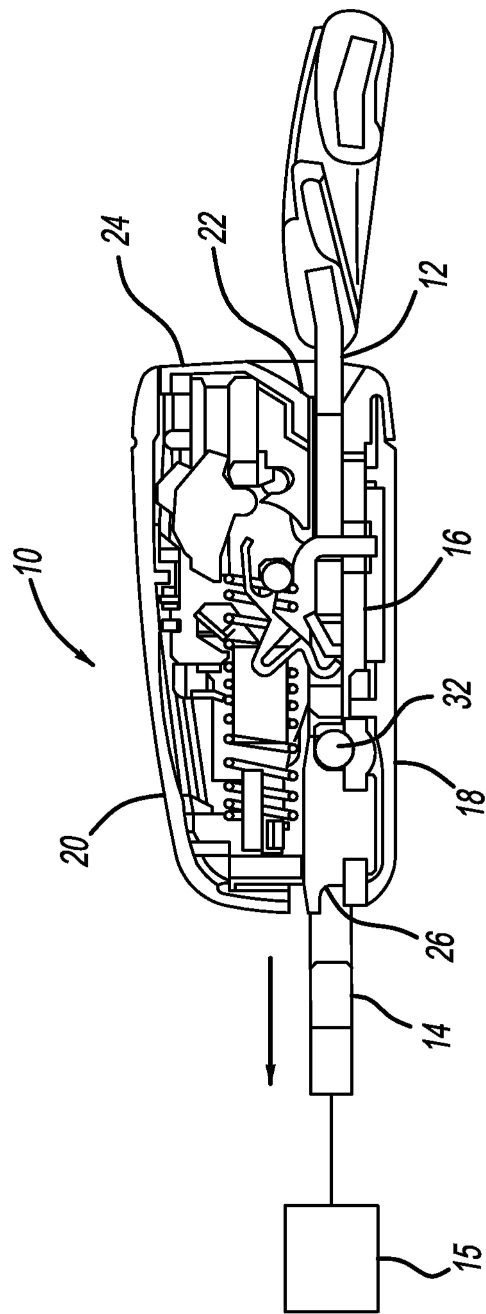
FIG. 1 is a cross-sectional view through a buckle assembly and a portion of a seatbelt restraint system in accordance with the prior art illustrating the buckle exposed to pretensioning forces.
Figure 2:
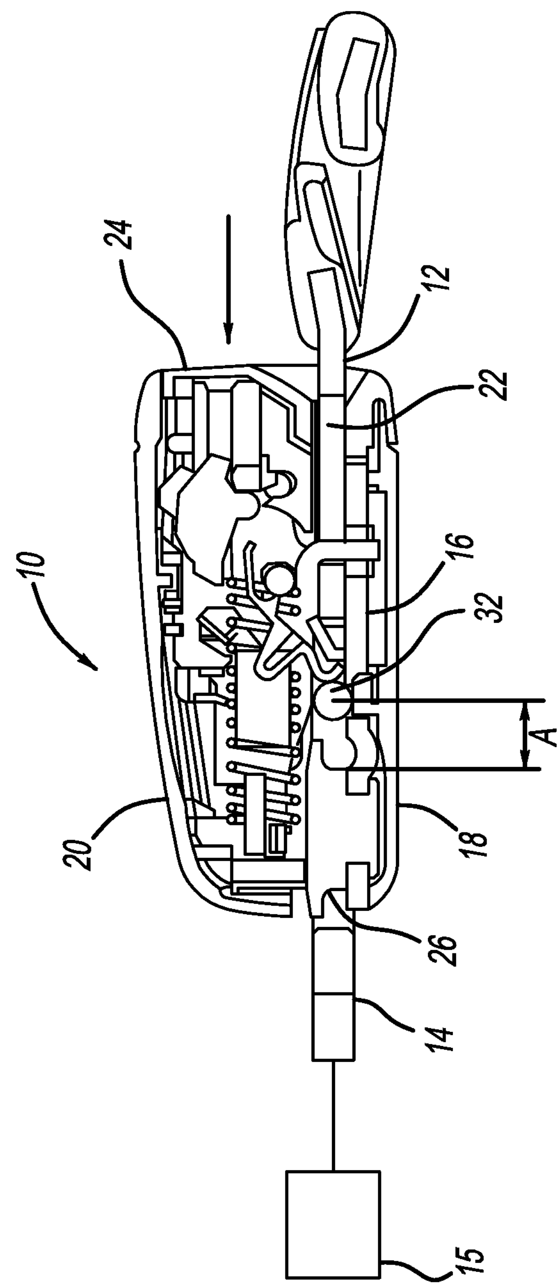
FIG. 2 is a cross-sectional view through a buckle assembly and a portion of a seatbelt restraint assembly in accordance with the prior art illustrating the buckle after pretensioning forces are relieved, resulting in protrusion of the anchor cable into the buckle.
Figure 3:
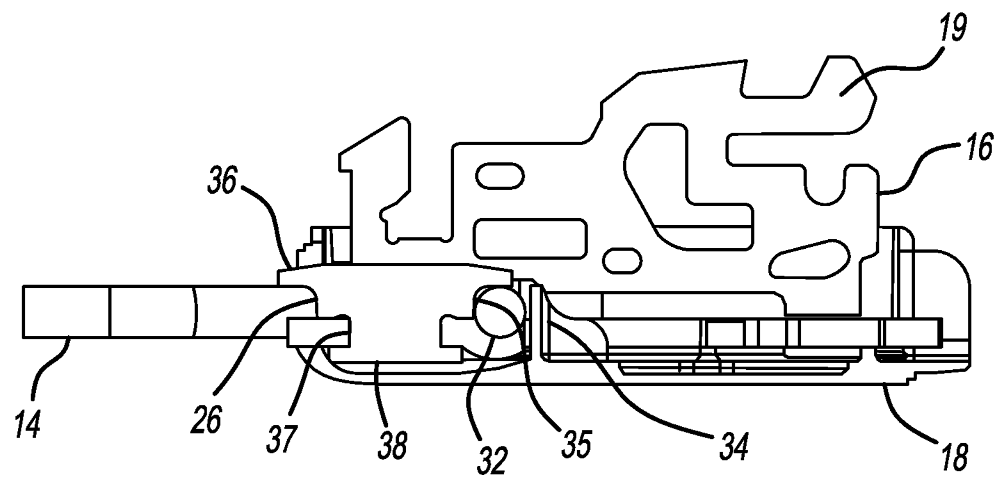
FIG. 3 is a side view of a buckle assembly showing a portion of the housing base configured to block cable protrusion providing a first embodiment of a cable protrusion blocking device in accordance with this invention.

FIGS. 1 and 2 illustrate portions of a seatbelt system in accordance with the prior art. As shown, buckle assembly 10 is shown with an attached latch plate 12 which is mounted to a vehicle structural member (not shown) by attachment cable 14. The cross-sectional views of FIGS. 1 and 2 show numerous internal components of buckle assembly 10 which are well-known elements, which include buckle frame 16, outer case clamshell halves 18 and 20 which form latch plate insertion slot 22, and buckle release pushbutton 24. Numerous other internal components are illustrated in the figures but are not specific features of the present invention and accordingly are not further described herein. Attachment cable 14 wraps around attachment rivet 26 which is fixed to buckle frame 16. Buckle assembly 10 is connected with a buckle pretensioner 15 representative schematically.

FIG. 1 illustrates a downwardly directed force applied to attachment cable 14 represented by the arrow in the figure exerted by the associated pretensioner 15 acting forcefully to exert tension on the belt assembly by acting on buckle assembly 10. Although buckle assemblies 10 are shown in a generally horizontal orientation in the figures, they are more typically positioned in a generally vertical manner. FIG. 2 illustrates the condition of the components after the pretensioning force exerted onto attachment cable 14 completes its displacement. Pretensioning motion accelerates buckle assembly 10 in the direction toward pretensioner. The arrow in FIG. 2 indicates the velocity of buckle assembly 10 produced by activation of pretensioner 15. This rapid downward motion causes buckle assembly 10 to "overrun" cable assembly 14 which has stopped its motion which introduces slack into the cable assembly. Due to the wrapped connection of attachment cable 14 around rivet 26, a protrusion or excursion displacement of the loop portion 32 of the wrapped attachment cable 14 can occur into the internal mechanism of buckle assembly 10, which is indicated by the protrusion displacement indicated as dimension "A" in FIG. 2. As described previously, this is an undesirable occurrence which the present invention seeks to overcome. Several embodiments of buckle assembly devices are described herein which include a device to block the protrusion of attachment cable 14 into the internal components of buckle assembly 10.

With reference to FIGS. 3-6, a first embodiment of a device for preventing cable protrusion is illustrated. As shown by the figures, the buckle assembly case halves 18 and 20 are shown in more detail. These components snap-fit together with an interlocking features around their perimeter attachment. Case half 18 is fixed to buckle frame 16. These figures provide additional details of attachment cable 14. As illustrated, cable 14 wraps around rivet 26 to provide about 180° of circumferential wrapping angle between cable portions 28 and 30 which between them form loop portion 32. It is the loop portion 32 which is restrained from movement into buckle assembly 10 in accordance with this invention. Rivet 26 forms a central cylindrical portion 35, enlarged head 36, a reduced diameter cylindrical section 37, and a lower post portion 38. Cable 14 is affixed to buckle frame 16 being trapped by rivet head 36 and the retractor frame, with the cable wrapping around cylindrical portion 35. During assembly, rivet post portion 38 is deformed to permanently attach rivet 26 and cable 14 to buckle frame 16.

Figure 4:
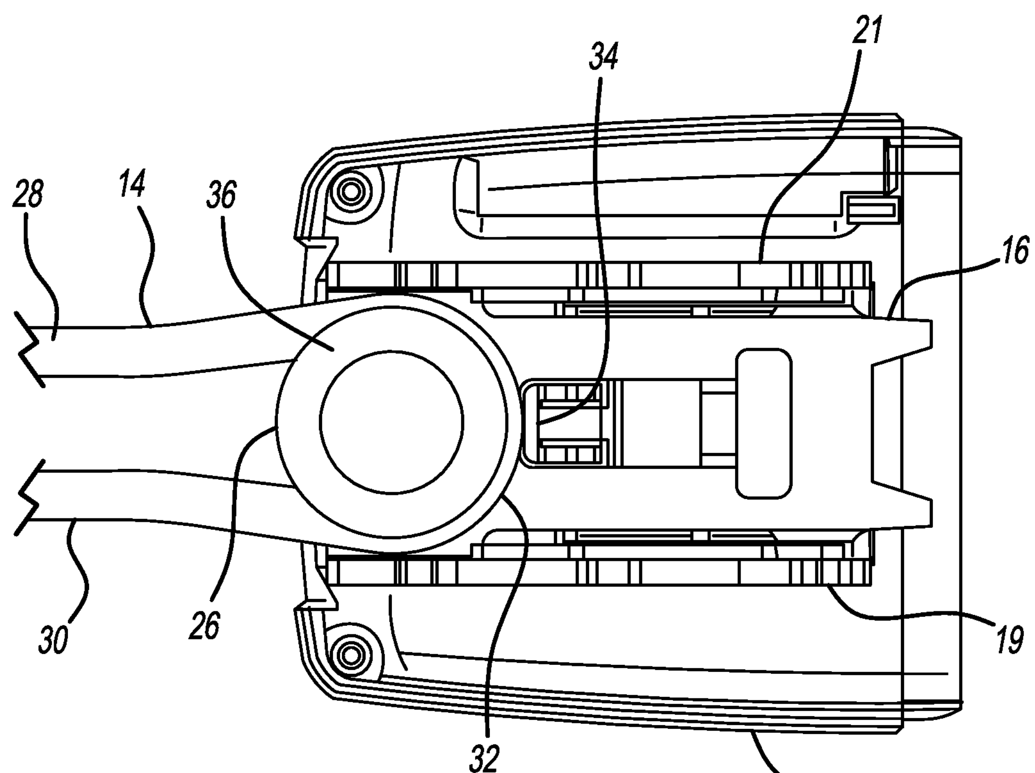
FIG. 4 is a top view of the assembly illustrated in FIG. 3.
Figure 6:
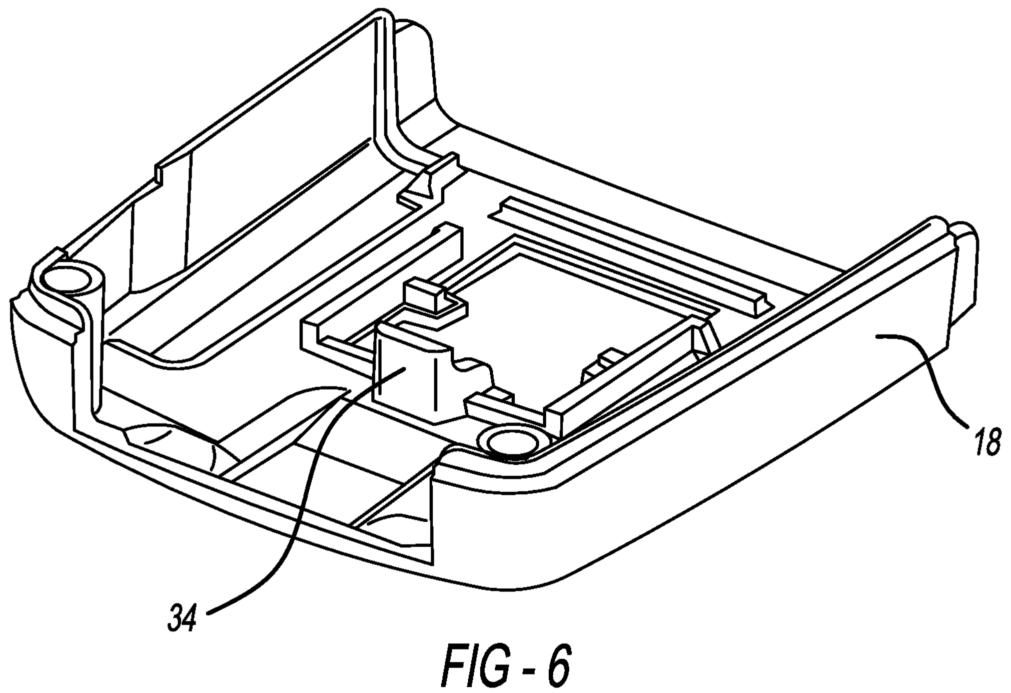
FIG. 6 is an isometric view of the housing base component of the first embodiment.
Figure 7:
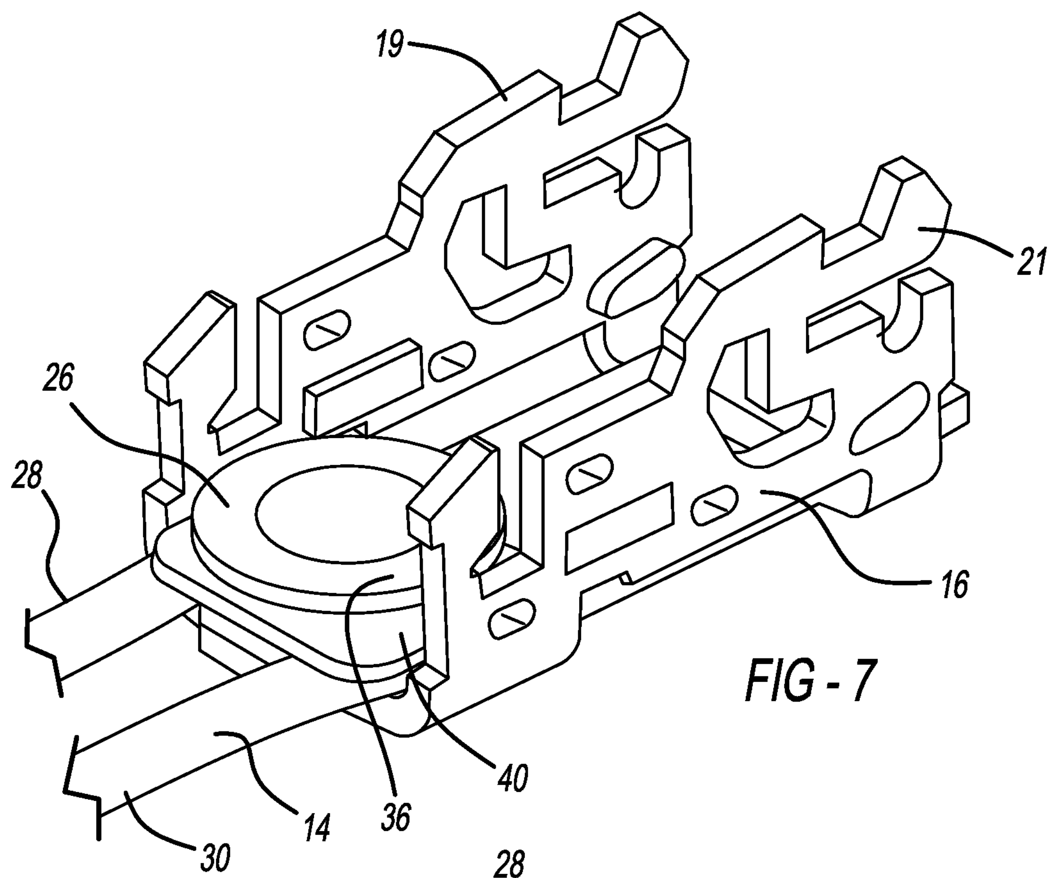
FIG. 7 is an isometric view of a representative seatbelt buckle assembly incorporating a toothed retainer plate for limiting cable protrusion in accordance with a second embodiment of a cable protrusion blocking device in accordance with this invention.
Figure 8:
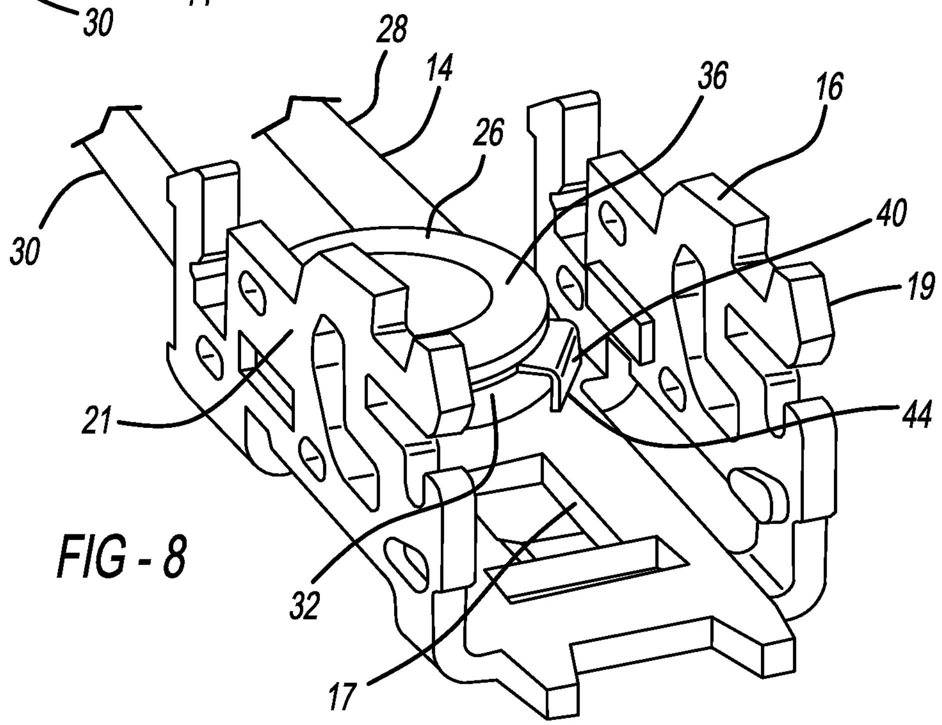
FIG. 8 is an isometric view of the assembly illustrated in FIG. 7.

Case half 18 in accordance with this embodiment features an upstanding wall or tab 34 which is positioned closely against or directly adjacent to cable loop portion 32 when these components are assembled. For this embodiment, the lower clamshell half 18 of the buckle housing forms the tab 34. The positioning of tab 34 functions to block protrusion movement of cable loop portion 32 into buckle assembly 10. FIG. 4 shows the close spacing between tab 34 and loop portion 32. FIG. 6 is a pictorial view of case half 18 showing tab 34. In an alternate embodiment (not shown) the features of tab 34 could alternatively be formed by case half 20, or the case halves 18 and 20 could cooperate to form the feature.

Figure 5:
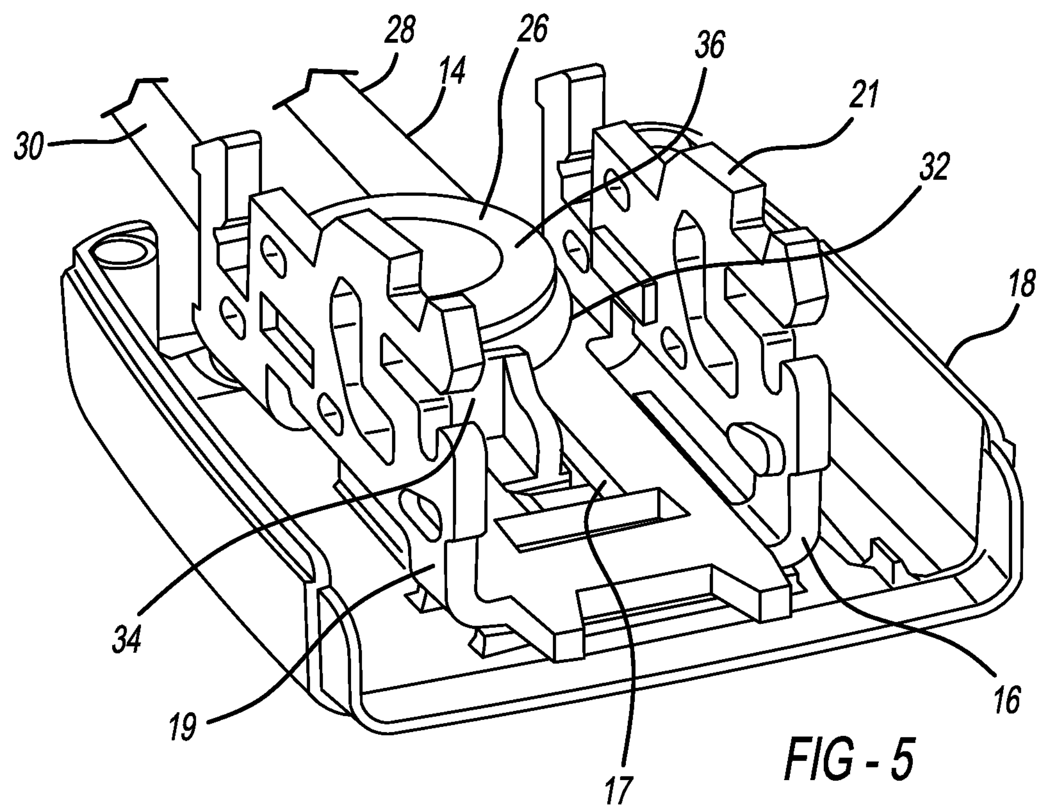
FIG. 5 is an isometric view of the assembly illustrated in FIG. 3.

In an assembly process, attachment cable 14 may be affixed to buckle frame 16 by attaching and plastically deforming rivet post portion 38. Thereafter, case half 18 can be affixed to cable frame 16 by suitable attachment features, such as discrete fasteners or integrated attachment provisions. An aperture 17 is formed in buckle frame 16 to provide passage for tab 34. Once the subassembly illustrated by FIG. 5 is produced, the other case half 20 (shown in FIGS. 1 and 2) can be attached to enclose the internal components of buckle assembly 10.

Now with reference to FIGS. 7-11, a second embodiment of a device for preventing protrusion is illustrated. For this embodiment, an additional retainer component 40 is provided. Retainer 40 is preferably formed of stamped sheet metal and features a central aperture 42, and a pair of upstanding teeth 44 and 46. The external perimeter shape of retainer 40 includes side flat surfaces 48 and 50 which have an anti-rotation function as will be described.

Figure 9:
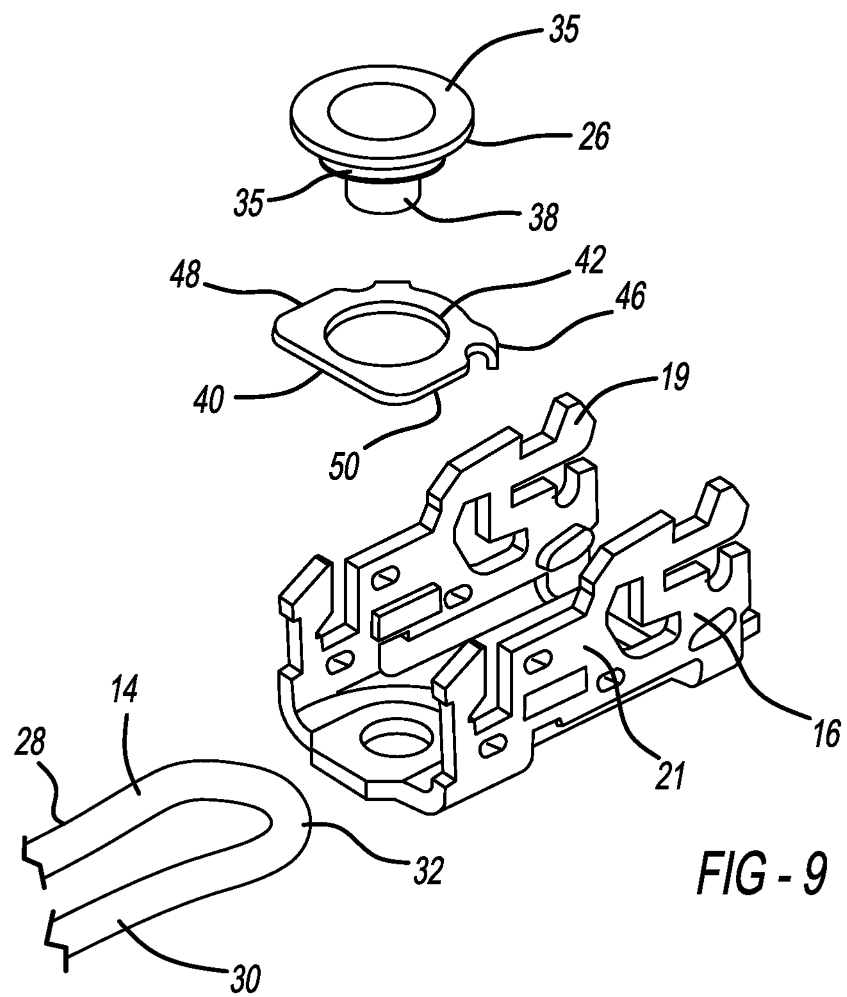
FIG. 9 is an exploded view of the assembly illustrated in FIG. 7.
Figure 10:
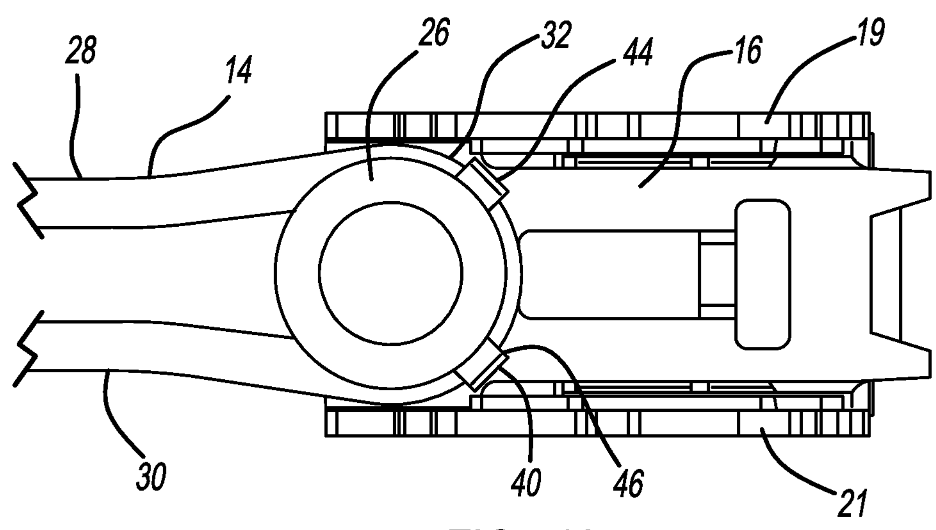
FIG. 10 is an elevational view of the assembly illustrated in FIG. 7.
Figure 11:
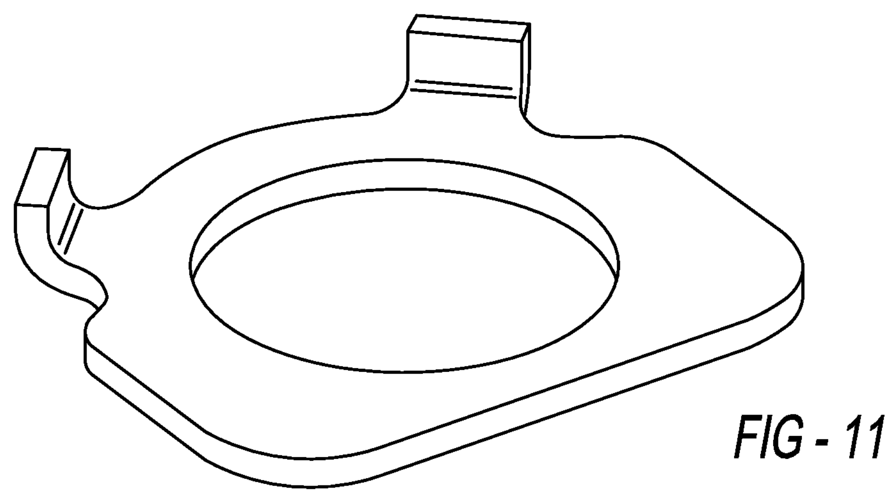
FIG. 11 is an isometric view of the toothed retainer plate cable protrusion blocking device in accordance with the second embodiment of this invention.

FIG. 9 illustrates an assembly sequence utilizing retainer 40. For this embodiment, retainer 40 is sandwiched between rivet head 36 and cable loop portion 32. As shown, retainer 40 is dropped into position between upstanding side walls 19 and 21 of buckle frame 16. Side flat edges 48 and 50 cause retainer 40 to be restrained from rotational motion relative to rivet 26 once the rivet is installed. Retainer teeth 44 and 46 at least partially wrap around and embrace segments of cable loop portion 32 to prevent the protrusion motion described previously by restraining cable loop portion 32 from moving away from its wrapped engagement with rivet 26.

Figure 12:
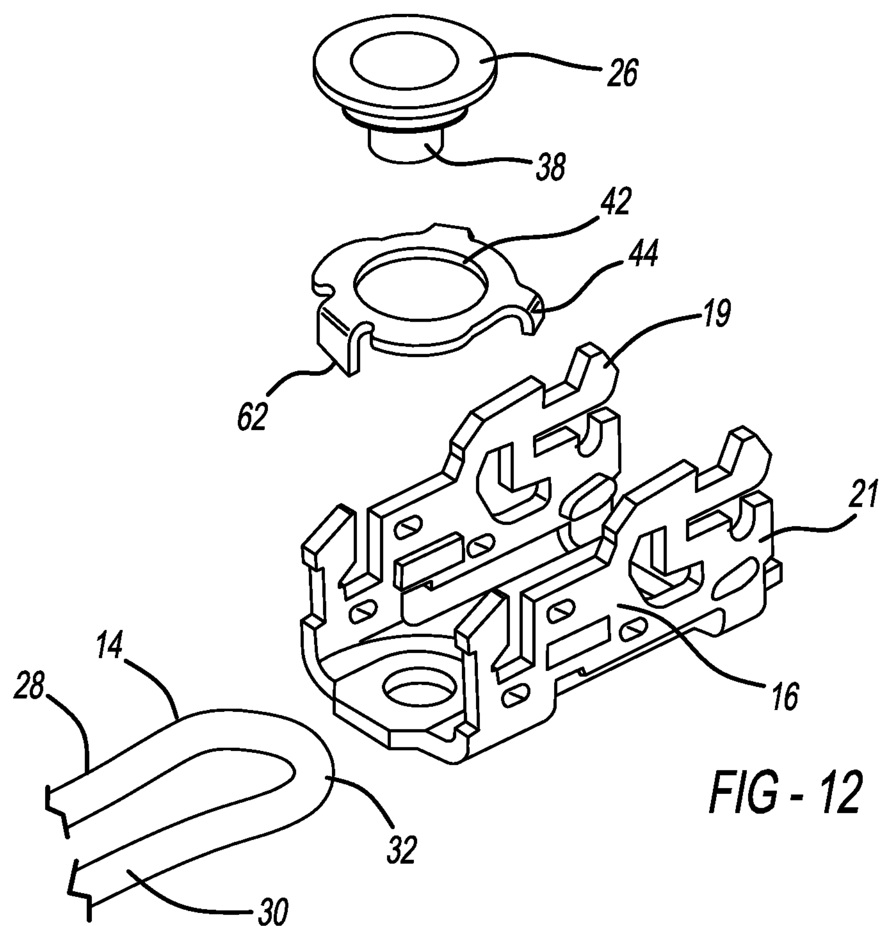
FIG. 12 is an exploded isometric view of a representative seatbelt buckle assembly incorporating a toothed retainer plate as a cable protrusion blocking feature in accordance with a third embodiment of the present invention.
Figure 13:
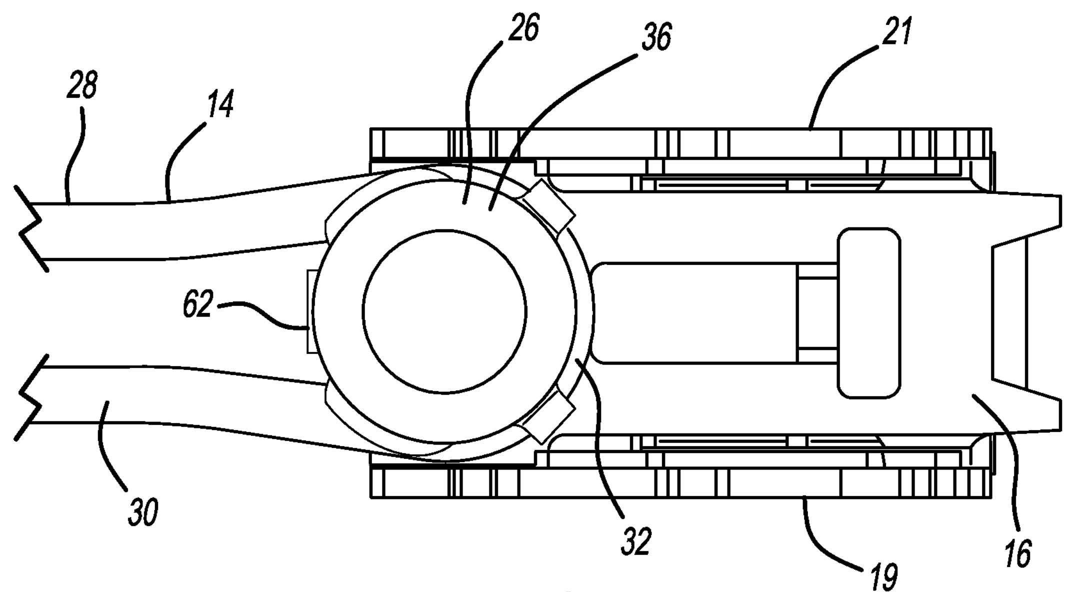
FIG. 13 is a top view of the seat belt buckle shown in FIG. 12.
Figure 14:
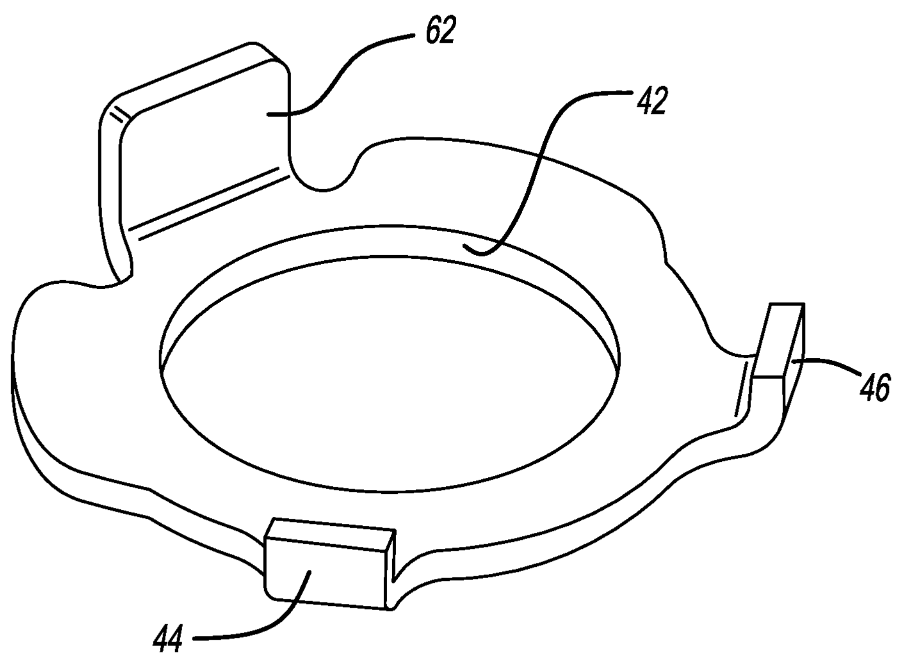
FIG. 14 is an isometric view of the toothed plate cable protrusion blocking device in accordance with the third embodiment.

FIGS. 12-14 illustrate a third embodiment of a device for preventing protrusion in accordance with the present invention. For this embodiment, retainer 60 is provided having some features identical to or similar to those of retainer 40 which are identified by like reference numbers, including central aperture 42, and a pair of teeth 44 and 46. For this embodiment however, retainer 60 provides a modified approach to providing an anti-rotation feature. In this case, retainer 60 further forms in anti-rotation tab 62. When the components are assembled, anti-rotation tab 62 fits in the spaced apart gap between cable portions 28 and 30. This embodiment operates in a manner similar to that described previously in connection with retainer 40, with teeth 44 and 46 blocking protrusion displacement of cable loop portion 32.

Figure 15:
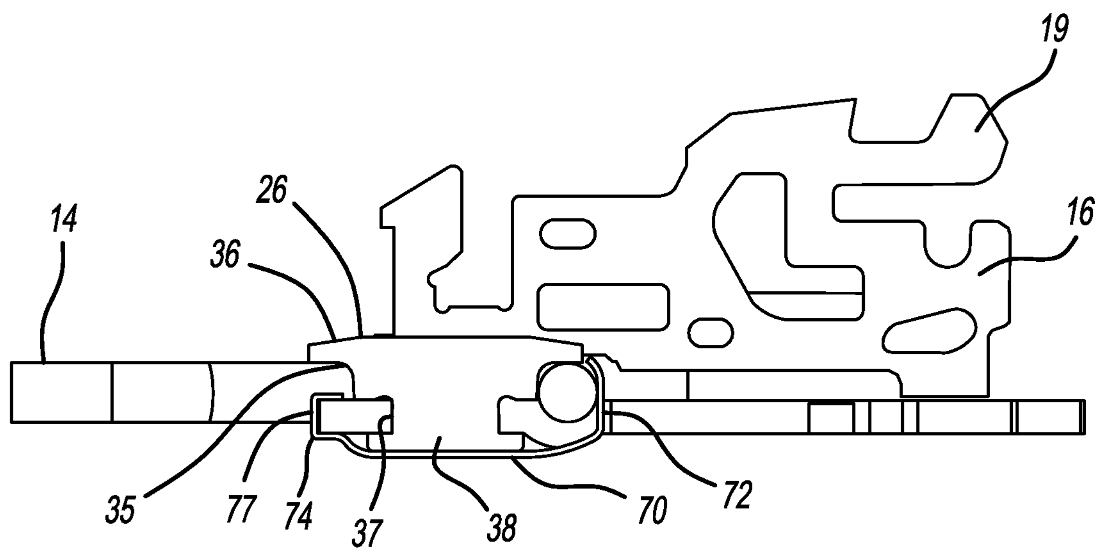
FIG. 15 is a side cross-sectional view of a representative seatbelt buckle incorporating a spring clip protrusion prevention device in accordance with a fourth embodiment of the present invention.
Figure 16:
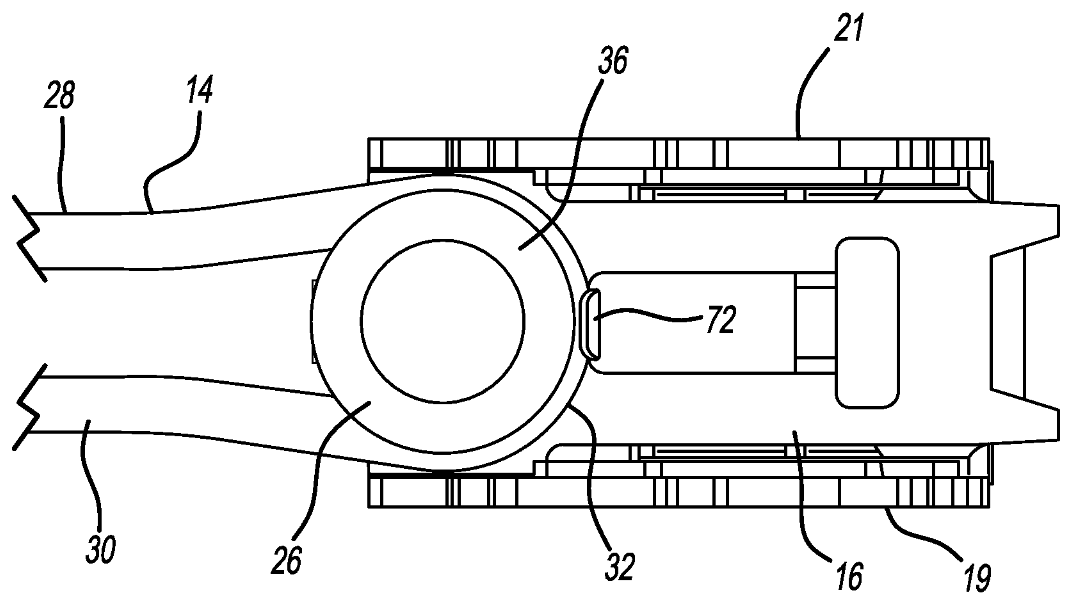
FIG. 16 is a top view of the assembly shown in FIG. 15.
Figure 17:
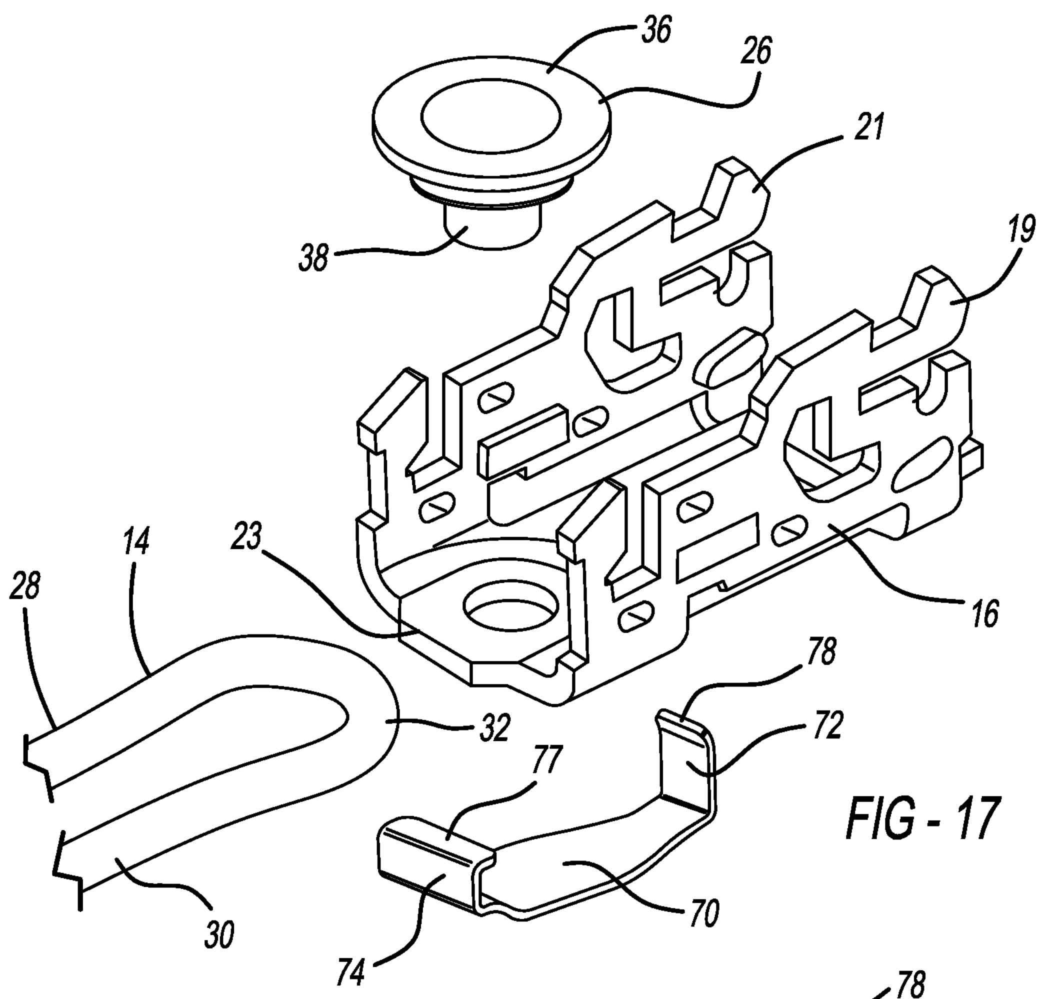
FIG. 17 is an exploded pictorial view of the seatbelt buckle shown in FIG. 15.
Figure 18:
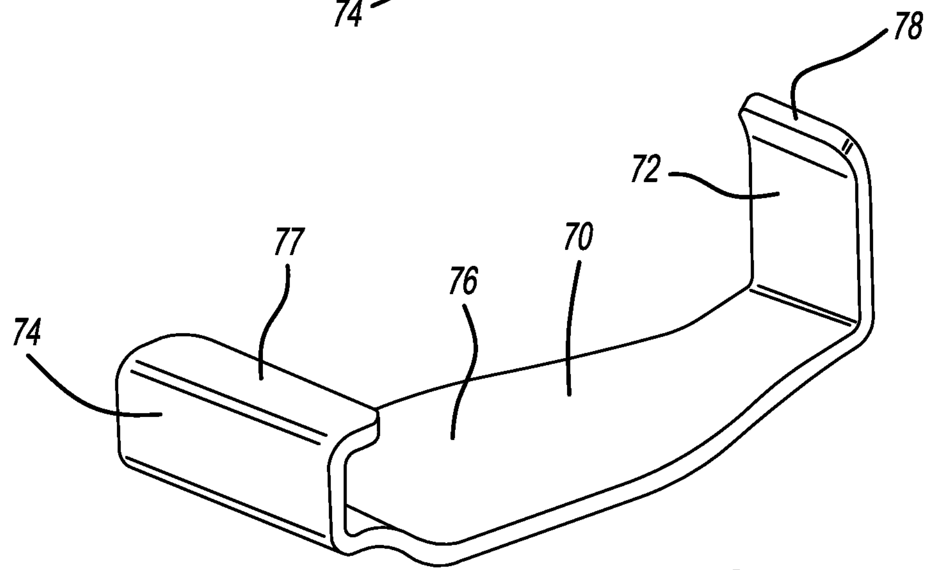
FIG. 18 is an isometric view of the spring clip in accordance with the fourth embodiment.
Figure 19:
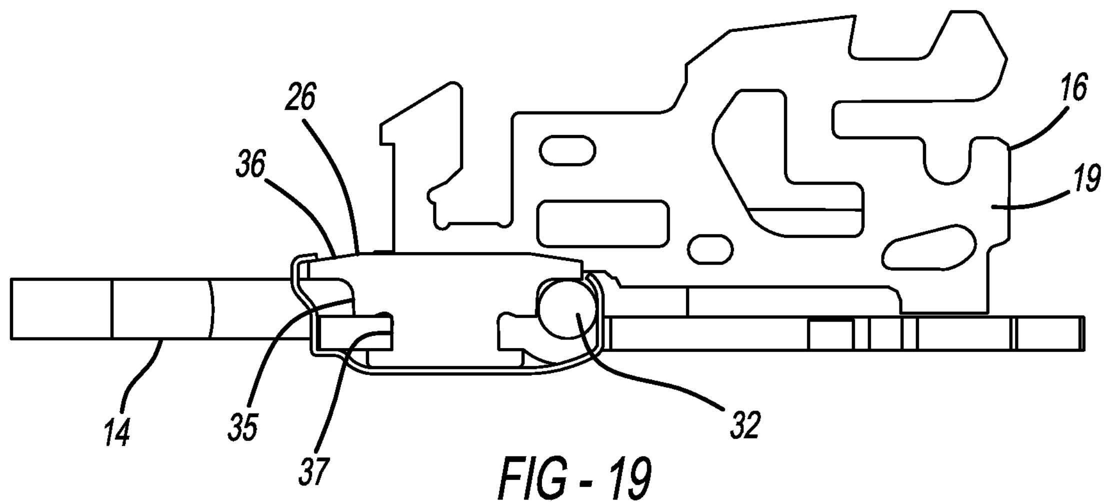
FIG. 19 is a side cross-sectional view of a representative seatbelt buckle assembly incorporating a spring clip protrusion prevention device in accordance with a fifth embodiment of the present invention.
Figure 20:
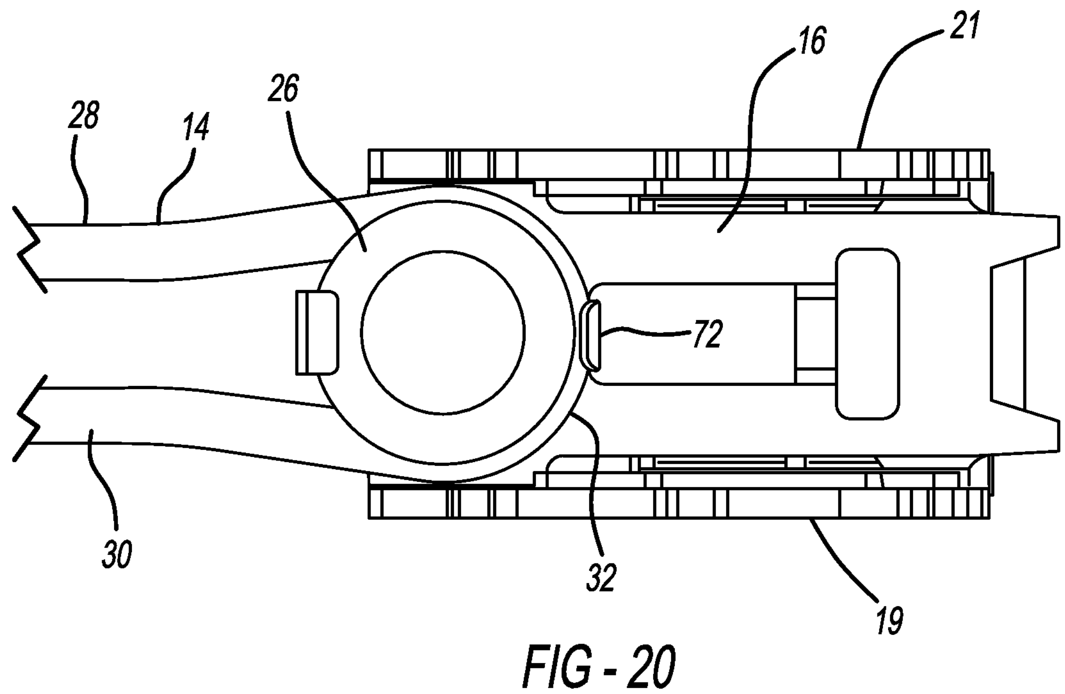
FIG. 20 is a top view of the assembly shown in FIG. 19.
Figure 21:
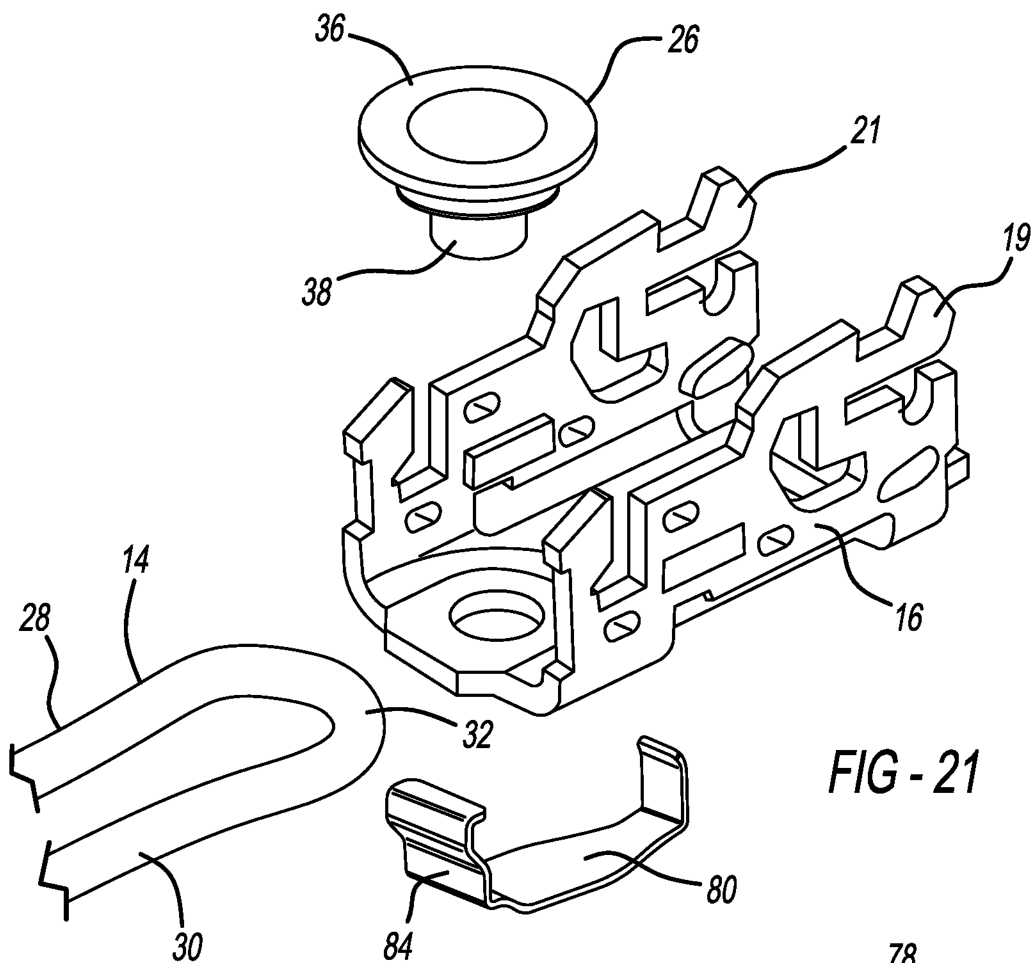
FIG. 21 is an exploded pictorial view of the seatbelt buckle shown in FIG. 19.
Figure 22:
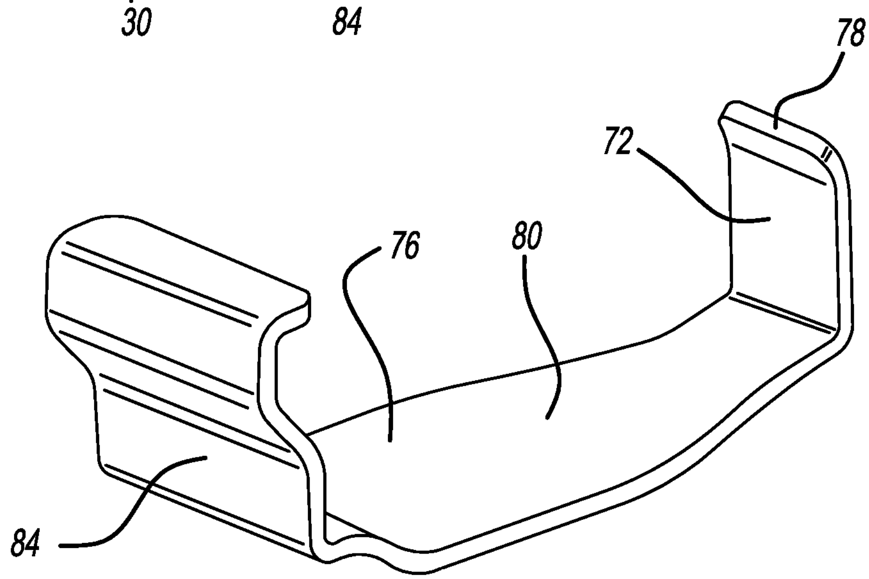
FIG. 22 is an isometric view of the spring clip in accordance with the fifth embodiment of the present invention.

Now with reference to FIGS. 15-17, a fourth embodiment of a device for preventing cable protrusion is illustrated. In this case clip 70 is provided which is a fixed to buckle assembly 10 after cable 14 is fastened to buckle frame 16 by rivet 26. Clip 70 has a generally letter "C" shape with a central section 76 and a pair of opposed upstanding legs 72 and 74. Leg 72 is shaped to wrap around and engage cable loop portion 32. Leg 74 has a shaped formation with edge 77 and is adapted to wrap around and engage edge 23 of buckle frame 16. When installed clip central section 76 spans across rivet post portion 38. Leg 74 is wide enough laterally to provide the same anti-rotation feature as provided by retainer 60, fitting between cable portions 28 and 30. Clip 70 provides the advantage that it can be incorporated perhaps in a more convenient manner during the assembly process, after the subassembly mentioned previously is formed. Clip legs 72 and 74 are shaped to snap into position and be retained by spring force as clip edges 77 and 78 wrap around and engage buckle frame edge 23 and cable loop portion 32 respectively. Leg 72 embraces loop portion 32 and restricts protrusion movement. Clip 70 is preferably formed of sheet-metal of a type providing features of a spring which can undergo significant elastic deformation for installation.

Now with reference to FIGS. 19-22, a fifth embodiment of a device for preventing protrusion is illustrated. For this embodiment, clip 80 is provided having features very similar to those of clip 70, including central section 76, and leg 74 terminate at edge 78. In this case, leg 72 as a shape which may be identical to clip leg 72 described previously. However, in this embodiment, clip leg 84 extends not only to prevent rotation like clip 70 but includes edge 86 to engage with the upper surface of the rivet head 36. Clip 80 provides the protrusion prevention feature in a manner identical to that of clip 70, with edge 78 and leg 72 embracing and restraining cable loop portion 32.

In this description cable assembly 14 is affixed to a retractor frame 16 by rivet 26 which forms an attachment feature. In another embodiment not illustrated another type of formation of buckle frame 16 could be provided to structurally connect with cable assembly 14. Certain embodiments of the present invention could be utilized in such alternate configurations, including the first embodiment which provides tab 34.

While the above description constitutes the preferred embodiment of the present invention, it will be appreciated that the invention is susceptible to modification, variation and change without departing from the proper scope and fair meaning of the accompanying claims.

The invention claimed is:

1. A device for preventing protrusion of a seatbelt anchorage cable into a seat belt system buckle assembly during operation of a pretensioner coupled with the cable and the buckle assembly, the cable of a type affixed at a first end to the pretensioner, and at a second end to the buckle assembly, the cable further of the type having an end wrap forming a loop around a rivet affixed to a frame of the buckle assembly, the cable loop wrapping around the rivet, the rivet of a type having an enlarged head, a central cylindrical portion, and a reduced diameter cylindrical section for being affixed to the frame, the device comprising: a protrusion prevention feature in the form of a retainer ring positioned adjacent to the cable loop and blocking movement of the loop into the buckle, the retainer ring having a central hole enabling the retainer ring to be affixed to the buckle frame by attachment of the rivet, the retainer ring central hole closely conforming with the rivet central cylindrical portion, the retainer ring having at least a first and a second tooth partially wrapping around the cable loop for blocking movement of the loop into the buckle, the retainer ring having a least one anti-rotation feature cooperating with the buckle frame to prevent the retainer ring from rotation relative to the frame, the retainer ring and the cable being clamped by the rivet head and buckle assembly frame into a fixed position between the retainer ring and the frame.

2. The device according to claim 1 further comprising the anti-rotation feature in the form of a surface of the retainer ring trapped against a side wall of the buckle frame.

3. The device according to claim 1 further comprising the anti-rotation feature in the form of a pair of side surfaces of the retainer ring trapped against side walls of the buckle frame.

4. The device according to claim 1 further comprising the retainer having a formed anti-rotation tab positioned within a gap formed between end portions of the cable loop, the anti-rotation tab preventing the ring from rotating relative to the frame.

5. The device according to claim 1 further comprising the retainer ring clamped between the head of the rivet and the cable loop.

* * * * *